United States Patent [19]
Young et al.

[11] Patent Number: 5,589,944
[45] Date of Patent: Dec. 31, 1996

[54] METHOD AND APPARATUS FOR GENERATING A VIDEO SIGNAL PRODUCING AN UNVIEWABLE DISPLAY FROM A VIDEOTAPE RECORDING THEREOF

[76] Inventors: Philip L. Young, 1548 County Rd. 59, Fremont, Ohio 43420; Leonard H. Greenberg, 1147 Elm Ave., No. 204, Glendale, Calif. 91201

[21] Appl. No.: 333,355

[22] Filed: Nov. 2, 1994

Related U.S. Application Data

[63] Continuation of Ser. No. 75,052, Jun. 10, 1993, abandoned.

[51] Int. Cl.[6] .......................... H04N 5/76; G11B 15/04; G11B 19/04
[52] U.S. Cl. ...................... 386/84; 360/60; 386/94
[58] Field of Search .......................... 358/335, 310, 358/319; 360/33.1, 60, 37.1; 380/5, 14, 15; H04N 5/76, 5/78, 5/781, 5/782, 5/783, 5/79, 9/80, 9/44, 5/04, 5/06, 5/92

[56] References Cited

U.S. PATENT DOCUMENTS

| | | |
|---|---|---|
| 4,163,253 | 7/1979 | Morio et al. |
| 4,488,176 | 12/1984 | Bond et al. .................. 360/33.1 |
| 4,488,183 | 12/1984 | Kinjo . |
| 4,571,642 | 2/1976 | Hofstein . |
| 4,577,216 | 3/1986 | Ryan . |
| 4,673,981 | 6/1987 | Lippman et al. ............... 358/160 |
| 4,737,862 | 4/1988 | Koga . |
| 4,775,901 | 10/1988 | Nakano ........................ 360/60 |
| 4,819,098 | 4/1989 | Ryan . |
| 4,914,694 | 4/1990 | Leonard et al. ................ 360/60 |
| 5,034,981 | 7/1991 | Leonard et al. ................ 360/60 |
| 5,251,041 | 10/1993 | Young et al. .................. 358/335 |

FOREIGN PATENT DOCUMENTS 904305  4/1990  WIPO .

OTHER PUBLICATIONS

PCT, WO90/04305, Wijnen et al., Apr. 19, 1990.

*Primary Examiner*—Thai Q. Tran
*Attorney, Agent, or Firm*—Howard & Howard Atty.

[57] ABSTRACT

A standard video signal is modified such that the modified video can be displayed in a normal fashion on a standard monitor device, yet copies made of the modified video signal by videotape recorders will reproduce a video signal containing disturbances which cause a generally unviewable display on a standard television or other video monitor device. The video signal is converted from a standard frame rate to a predetermined, non-standard frame rate video signal utilizing a videotape recorder modified to record at a non-standard speed.

20 Claims, 8 Drawing Sheets

METHOD AND APPARATUS FOR GENERATING A VIDEO SIGNAL PRODUCING AN UNVIEWABLE DISPLAY FROM A VIDEOTAPE RECORDING THEREOF

This is a continuation of application Ser. No. 08/075,052 filed on Jun. 10, 1993, now abandoned.

BACKGROUND OF THE INVENTION

The present invention discloses a method and apparatus for modifying a video signal in a manner such that the modified video may be displayed in a normal fashion on a standard monitor device (television, video monitor, etc.), yet copies made of the modified video signal by videotape recorders will reproduce a video signal containing disturbances which cause a generally unviewable display on a standard television or other video monitor device.

The proliferation of the consumer video cassette recorder (VCR) within recent decades has contributed to a reduction in the value of broadcast television programming. The general public now has the facility with which to record programs broadcast via conventional terrestrial television, cable and satellite, and watch them at any time it is convenient. The consumer can retain a copy of a program and watch it multiple times, detracting from a broadcaster's customer base. The consumer can also eliminate commercial advertisements inserted into the program material, which is the primary basis upon which the conventional television industry has been supported. The consumer may also make additional copies of program material to provide to other consumers.

More recently, burgeoning television industries such as Pay Per View, Compressed Multi-Program, High Definition, Videodisc and Interactive Television have emerged. The expanding interest in the dissemination of video information has intensified the demand for a method of protecting this valuable copyrighted program material.

There have been many attempts to satisfy this requirement. There are an abundance of patents aimed at protecting video program material which has been broadcast via encryption/decryption schemes. Such designs require the addition of special decoding circuitry at the consumer's location, and thus are irrelevant to this discussion.

Numerous patents have been awarded which are aimed at protecting program material which has been prerecorded onto the distribution media of videotape and laser videodisc, as well as for designs aimed at protecting broadcast video program material. Most of these patents and their disadvantages have been referenced in the applicant's prior allowed U.S. patent application Ser. No. 07/718,622 filed Jun. 21, 1991. U.S. Pat. No. 5,251,041 issued Oct. 5, 1993.

Processes which can generally be referred to as "time-base modulation" are exemplified in the U.S. Pat. Nos. 4,488,176, 4,673,981, 4,914,694 and 5,034,981, and the PCT application No. WO 90/04305. Certain portions of a video waveform are used by monitoring devices and VCR's to synchronize various circuits necessary for their proper operation. More specifically, the field rate which is derived from the vertical sync signal, and the line rate which is derived from the horizontal sync signal. In a VCR, these signals are used as references to adjust servo circuits which maintain correct tape and headwheel speed, and to correct for signal phase variations. Because these VCR circuits are generally more sensitive to sync timing variations than circuits used to synchronize scanning in a monitor device, several systems have been devised that exploit these differences. It is claimed that a video waveform modified by these systems will usually produce an acceptable display on a monitor device, while a copy of a thusly modified video signal recorded by a VCR, when played back, will exhibit speed and tracking fluctuations that produce a generally unacceptable display on a monitor device. While it is true that an unauthorized videotape recording of these signals will exhibit annoying disturbances in the viewed picture, other disturbing artifacts are produced by the copy protection process itself, which become evident while attempting to view the modified video signals, even before attempts are made to copy these signals.

Generally, these processes function to disturb a VCR's servo circuitry by modulating, or moving the position of the horizontal and/or vertical sync signals about their normal position. This is analogous to changing the frequency of the vertical and horizontal sync. The rationale is that a monitor device tends to be more forgiving of these deviations than a VCR. The standard frequency of these sync signals are the mean about which these frequencies are varied, both to reduce memory requirements within the digital conversion circuitry utilized, and to ensure that the program material does not vary too drastically from its normal elapsed time.

One problematic area with this approach is that by changing the sync frequency, the size of the picture is necessarily distorted. Compensation for geometric distortion caused by the fluctuating picture height, length and aspect ratio must be attempted, usually by dropping or adding pixels to picture elements. This involves highly complex circuitry required to determine the appropriateness of the compensation. To date, these types of logic designs have not achieved satisfactory performance, sometimes limiting the implementation of the time base modulation techniques to moments when there is a change in the picture scene, wherein it is hoped that the disturbances will be less noticeable.

Another area that has proven problematic is due to the fact that many monitor devices incorporate what is commonly referred to as a digital vertical countdown circuit. These circuits customarily compare successive vertical sync fields to determine what the vertical frequency is, before actually switching to a new vertical frequency. This is done primarily to improve the noise immunity of the vertical drive oscillator. Because there are many different vertical countdown arrangements, and because these designs undergo evolutionary changes, a wide variety of effects have been observed on different monitors when varying the vertical frequency. These anomalies can be caused by the detection of the standard vertical frequency when the vertical rate is modulated through this frequency, causing the monitor to attempt to display at a standard vertical rate, when in fact the video contains a changing, non-standard vertical rate. Other anomalies can be caused by the transition of changing the direction of the modulation of the vertical frequency, which must occur at some point in this scheme. If the shift from greater to less (or vice versa) vertical frequency is too abrupt, then monitors which incorporate a conventional analog-style vertical oscillator will not be able to react to the change quickly enough, producing violent "bouncing" in the displayed picture as the monitor attempts to adjust to the change. This can also occur in monitors incorporating digital vertical countdown circuits which revert to an analog mode when they cannot establish a fixed vertical rate.

Changing the number of lines contained within successive vertical fields can confound circuits utilized for decoding information sometimes placed within the vertical blanking interval. Such information includes closed captioning, videotext data, vertical interval reference signals (VIR), vertical interval test signals (VITS), vertical interval time code (VITC), station identification signals (SIDS), anti-ghost signals, etc. Decoding circuitry for these signals typically depend upon a standard vertical blanking interval for a reference with which to trigger a line counter. When the proper number of lines has elapsed, the decoder attempts to retrieve data from the line in which the data to be decoded is contained. Devices such as closed caption decoders will key text material over the active picture information so that the textual information is visible. A standard line count is assumed by these devices for accurate decoding and placement of decoded information. A non-standard and varying horizontal line count will cause unpredictable results.

Changing the horizontal frequency will necessarily change the horizontal line length. Many newer monitor devices contain a comb filter to provide for separation of the chroma and luminance signals, and for enhanced display of detail. Briefly, these comb filter circuits operate by comparing a given horizontal line to a previous horizontal line. The method of storing a previous horizontal line for comparison is usually accomplished by means of a glass delay line or charged coupled device. These storage devices have a fixed storage, or delay time equal to the length of a standard horizontal line. If the horizontal line length is modulated, as in some existing copy protection systems, artifacts will be produced in the displayed picture by the comb filter due to non-correlation between the varying length horizontal lines.

Changing the vertical frequency of a video signal will necessarily change the height of a displayed picture, causing a corresponding change in the duty cycle of the vertical deflection current. This can produce a shift in the quiescent center of the displayed picture and thus destroy the accuracy of the interlaced scanning system. Changing the size of a displayed picture also requires that the active video elements be shifted up or down accordingly, so that the positional movement of successive picture elements will be minimized. Because of differing monitor designs and their resultant reactions to these changes, it is difficult to envision a system of this type that will perform with similar ballistics on all existing monitor devices.

The above mentioned disadvantages detract from the practicality and desirability of these currently available copy protection systems.

SUMMARY OF THE INVENTION

The present invention concerns a method and apparatus for providing copy protection of a video signal in a manner such that the modified video may be displayed in a normal fashion on a standard monitor device, yet copies made of the modified video signal by videotape recorders will reproduce a video signal containing disturbances resulting in a generally unviewable display on a standard television or other video monitor device.

The system according to the present invention produces a fixed, non-standard frame rate format, and is intended for use with RF, fiber optic and cable broadcast transmission systems, and laser videodisc systems. This technology is based on the fact that most VCR's, and all consumer VCR's use the vertical sync signal of the video input during the record process as a reference for the head drum and capstan servo circuits. All video waveform specifications referenced within this document represent those typically found in NTSC standard video systems, although the present invention can be incorporated into other video standards. During playback, a vertical rate reference signal of 59.94 Hz, derived from the division of a fixed 3.58 MHz oscillator, is used as the vertical rate servo reference. If a faster or slower than standard vertical rate video signal is recorded, playback servo circuitry will attempt to reduce or increase the vertical rate to the 59.94 Hz standard incorporated as the playback servo reference. An increase or decrease of the input signal vertical rate of three percent or greater produces a servo error signal too large for the machine to correct, with a resultant loss of tracking. Variations in the vertical rate of less than three percent, though recordable and subsequently playable, produce a playback vertical rate and horizontal line length that differs from that of the originally input signal. As VCR's utilize a comb filter incorporating a fixed 63.556 μs delay, non-standard horizontal length playback outputs will produce time shifted chrominance and luminance artifacts as well as inaccurate comb differentiation.

The preferred embodiment of the present invention utilizes a video format with a 509-line, fixed frame length, while maintaining a standard 63.556 μs horizontal line length. This equates to a vertical rate of 61.824 Hz, or an increase in the vertical rate of just over three percent. This degree of increase is sufficient to inhibit making acceptable copies, and the unique format conversion techniques of the preferred embodiment eliminate any varying changes in display geometry, while guaranteeing perfect display stability and zero artifact generation. A method is disclosed within the specification which permits the modified video waveform signal to contain unmodified motion, duration and audio characteristics. A method and apparatus are also disclosed to allow a VCR to reproduce a video signal which has an altered vertical frequency period. The preferred embodiment contains provisions for decoding closed caption information and other signals and data inserted into a vertical interval.

It is therefore an object of the present invention to provide copy protection of a video signal in a manner such that the modified video may be displayed in a normal fashion on a standard monitor device, yet copies made of the modified video signal by videotape recorders will reproduce a video signal containing disturbances resulting in a generally unviewable display on a standard television or other video monitor device.

A second object of the invention is to provide a technique for modifying a video waveform such that the vertical frequency is converted to a fixed, unconventional period.

A third object of the invention is to provide a video waveform copy protection technique which utilizes standard length horizontal lines, to prevent the creation of comb filter generated artifacts.

A fourth object of the invention is to provide a video waveform copy protection technique which uses fixed horizontal and vertical periods, resulting in no discernable varying geometric distortions in the displayed picture.

A fifth object of the invention is to provide a video waveform copy protection technique which utilizes a fixed unconventional vertical period, resulting in no discernable vertical oscillator perturbations in video monitor devices.

A sixth object of the invention is to provide a video waveform copy protection technique which incorporates a fixed unconventional vertical period, resulting in no discernable scan interlace perturbations in video monitor devices.

A seventh object of the invention is to provide a video waveform copy protection technique which uses a fixed unconventional period, resulting in the elimination of the necessity of compensating for varying picture size by changing the position of the active video signal within the vertical scanning period, and the associated anomalies caused by this action.

An eighth object of the invention is to provide a video waveform copy protection technique which utilizes a fixed unconventional vertical period, not requiring large amounts of digital memory to accomplish a conversion in frame periods.

A ninth object of the invention is to provide a video waveform copy protection technique which uses a modified frame period, yet retains a correct chrominance to luminance interleave relationship.

A tenth object of the invention is to provide a method of producing a modified frame period video waveform copy protection technique which retains normal program motion, duration and audio quality attributes.

An eleventh object of the invention is to provide a means and apparatus for modifying a VCR to allow reproduction of a modified field period video waveform signal.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Discussions related to VCR operation will reference VCR's of the VHS format. It should be understood that most consumer VCR's utilize similar technology and therefore perform in a manner similar with respect to the operation of the present invention. It is assumed that the reader has a basic understanding of the operation of such prior art equipment.

Figure 1:
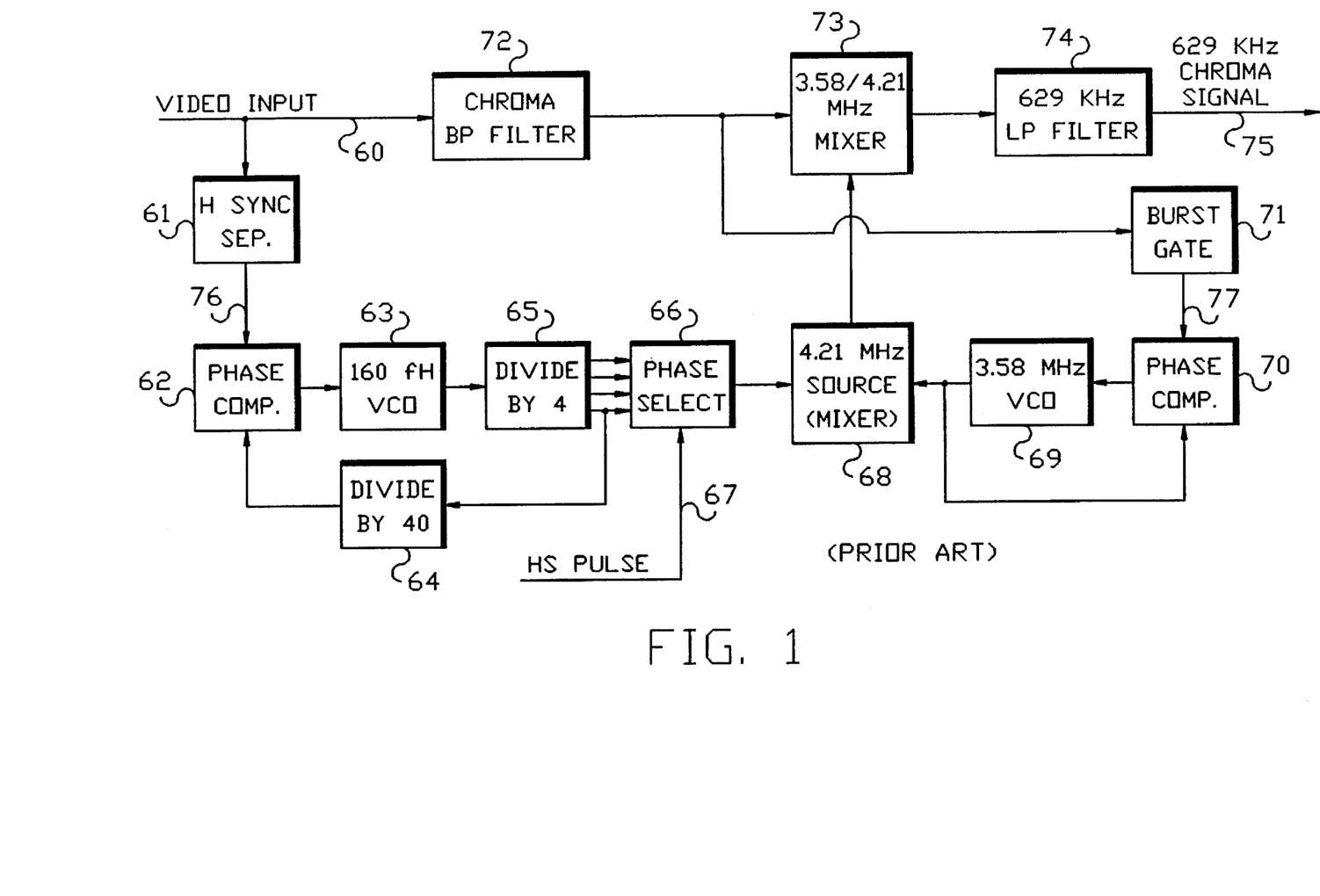
FIG. 1 is a schematic block diagram of typical color-under record circuitry inherent in consumer-grade VCR's.
Figure 2:
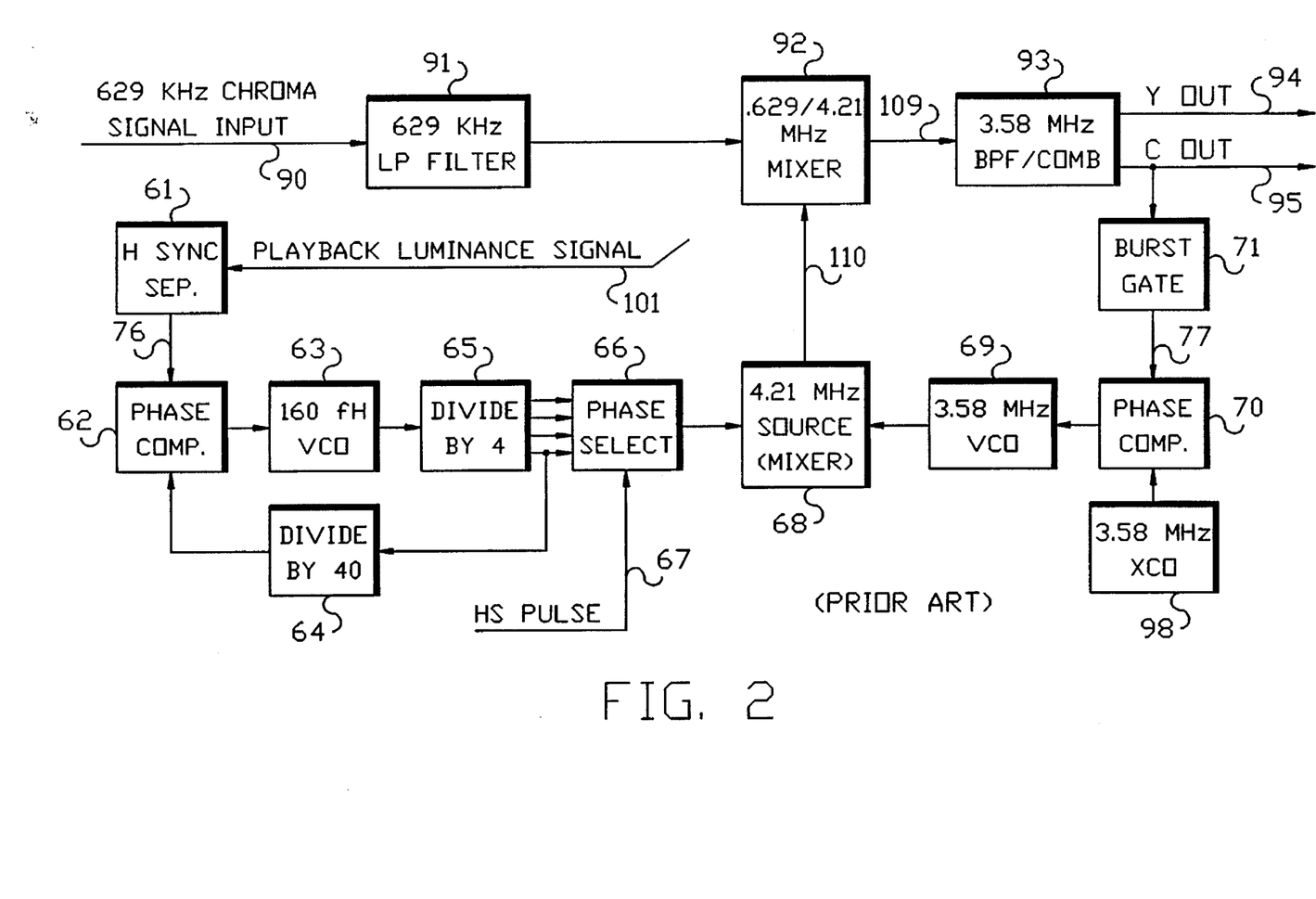
FIG. 2 is a schematic block diagram of typical color-under playback circuitry inherent in consumer-grade VCR's.

The FIG. 1 and the FIG. 2 are schematic block diagrams of the basic circuits employed in the color-under process of VHS format VCR's during the record and play process respectively. In the FIG. 1, a standard video input signal is generated as an input on a video input signal line 60 connected to an input of a horizontal sync separator circuit (H SYNC SEP.) 61. An output of the circuit 61 is connected to a first input of a phase comparator circuit (PHASE COMP.) 62 by a line 76. An output of the circuit 62 is connected to an input of a voltage controlled oscillator circuit (160 fH VCO) 63 and a second input of the circuit 62 is connected to an outout of a divide by forty circuit (DIVIDE BY 40) 64. An output of the circuit 63 is connected to an input of a divide by four (DIVIDE BY 4) circuit 65 having four outputs connected to four associated inputs of a phase select circuit (PHASE SELECT) 66 and one of the four outputs also is connected to an input of the circuit 64. A fifth input of the circuit 66 is connected to a line 67 and an output is connected to a first input of a mixer or frequency source circuit (4.21 MHz SOURCE (MIXER)) 68. A second input of the circuit 68 is connected to an output of a voltage controlled oscillator circuit (3.58 MHz VCO) 69 having an input Connected to an output of a phase comparator circuit (PHASE COMP.) 70. A first input of the circuit 70 is connected to the output of the circuit 69 and a second input is connected to an output of a burst gate circuit (BURST GATE) 71 by a line 77. The input line 60 is also connected to an input of a chroma bandpass filter circuit (CHROMA BP FILTER) 72 having an output connected to an input of the circuit 71 and to a first input of a mixer circuit (3.58/4.21 MHz MIXER) 73. A second input of the circuit 73 is connected to an output of the circuit 68 and an output of the circuit 73 is connected to an input of a low pass filter circuit 74. An output of the circuit 74 is connected to a line 75 to generate a 629 KHz chroma signal.

In the FIG. 2, a 629 KHz chroma signal is input on a line 90 connected to an input of a low pass filter circuit (629 KHz LP FILTER) 91. An output of the circuit 91 is connected to a first input of a mixer circuit (0.629/4.21 MHz MIXER) 92 having a second input connected to the output of the circuit 68 by a line 110. An output of the circuit 92 is connected to an input of a bandpass frequency/comb filter circuit (3.58 MHz BPF/COMB) 93 by a line 109. The circuit 93 has a first output connected to a line 94 for generating a "Y OUT" signal and a second output connected to a line 95 for generating a "C OUT" signal. The line 95 is connected to the input of the circuit 71. A crystal controlled oscillator circuit (3.58 MHz XCO) circuit 98 has an output connected to the first input of the circuit 70 which input is disconnected from the output of the circuit 69. The input of the circuit 61 is disconnected from the line 60 and is connected to a line 101 to receive a playback luminance signal.

Of primary interest, it should be noted that these circuits perform as closed loop servos, and are referenced to three signals to maintain servo lock. These three signals are present on the horizontal sync signal line 76, the burst signal line 77, and the head switching pulse signal line 67. During record, as illustrated in the FIG. 1, the burst signal on the line 77 and horizontal sync signal on the line 76 are derived from the video input signal on the line 60, while the head switching pulse signal on the line 67 is phase locked to the vertical sync of the video input signal.

During playback, as illustrated in the FIG. 2, the burst signal on the signal line 77 and horizontal sync signal on the line 76 are derived from playback video input signals present on the signal lines 90 and 101, while the head switching pulse signal on the line 67 is phase locked to a 59.94 Hz reference divided down from the 3.58 MHz crystal controlled oscillator 98. It should also be noted that during playback, an up-converted chroma signal on the line 109 is passed through the comb filter 93 which utilizes a fixed 63.556 µs delay line. Although these circuits are of secondary importance to the operation of the present invention, they are included here as a brief review of the basic operation of a VCR, and will be referred to below.

Figure 3:
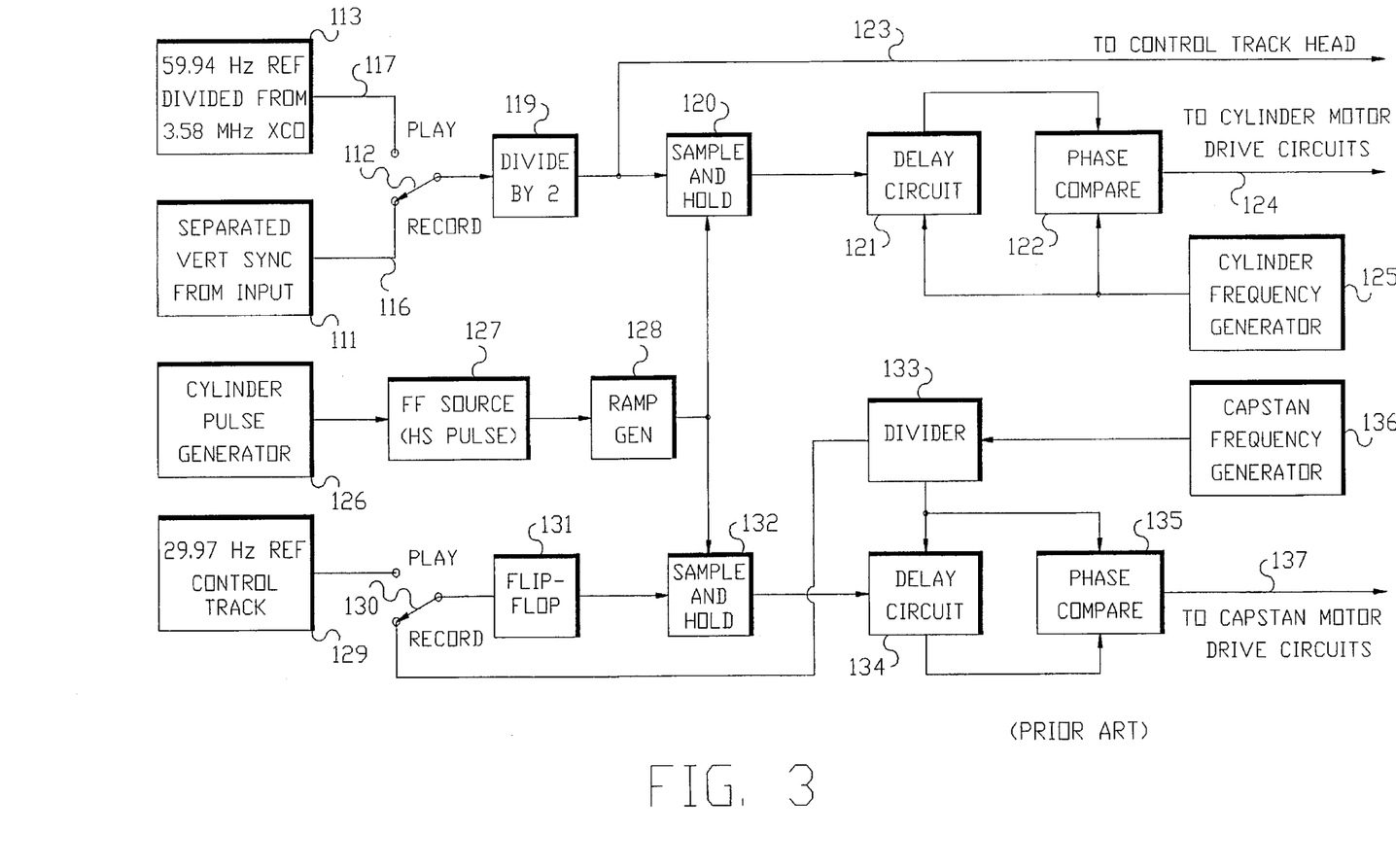
FIG. 3 is a schematic block diagram of typical analog motor control servo circuitry inherent in some consumer-grade VCR's.

The FIG. 3 depicts the basic analog motor control servo circuitry of a VHS machine. As can be seen, there are two separate, yet interlocked servo systems. The first servo circuit includes the circuit elements 111, 112, 113, 119, 120, 121, 122, 125, 126, 128 and 129 and controls the video head cylinder motor. The second servo loop includes the elements 126, 127, 128, 129, 130, 131, 132, 133, 134, 135 and 136 and operates the capstan motor, which determines tape speed and ensures accurate tracking of the video heads across the videotape.

In the first servo circuit, a source (SEPARATED VERT SYNC FROM INPUT) 111 of the vertical sync signal has an output connected to one terminal of a single pole, double throw switch 112 by a line 116. The source 111 represents circuitry (not shown) which separates the vertical sync signal from the video input signal on the line 60 in the FIG. 1. A source (59.94 Hz REF DIVIDED FROM 3.58 MHz XCO) 113 of a 59.94 Hz reference signal has an output connected to a second terminal of the switch 112 by a line 117. A contact of the switch 112 is connected to an input of a divider circuit (DIVIDE BY 2) 119. An output of the circuit 119 is connected to a first input of a sample and hold circuit (SAMPLE AND HOLD) 120 having an output connected to a first input of a delay circuit (DELAY CIRCUIT) 121. The circuit 121 has an output connected to a first input of a phase comparator circuit (PHASE COMPARE) 122. The output of the circuit 119 is also connected to a line 123 for generating a signal to the control track head. An output of the circuit 122 is connected to a line 124 for generating a signal to the cylinder motor drive circuits. A frequency generator circuit (CYLINDER FREQUENCY GENERATOR) 125 has an output connected to a second input of each of the circuits 121 and 122.

A pulse generator circuit (CYLINDER PULSE GENERATOR) 126 has an output connected to an input of a flip-flop circuit (FF SOURCE (HS PULSE)) 127 to generate a head switching pulse. The circuit 127 has an output connected to an input of a ramp generator circuit (RAMP GEN) 128. An output of the circuit 128 is connected to a second input of the circuit 120 and to a first input of a second sample and hold circuit (SAMPLE AND HOLD) 132. A reference control track circuit (29.97 Hz REF CONTROL TRACK) 129 has an output connected to a first terminal of a single pole, double throw switch 130. A contact of the switch 130 is connected to an input of a flip-flop circuit (FLIP-FLOP) 131 having an output connected to a second input of the circuit 132. A second terminal of the switch 130 is connected to a first output of a divider circuit (DIVIDER) 133. A second output of the circuit 133 is connected to a first input of a delay circuit (DELAY CIRCUIT) 134 and an output of the circuit 132 is connected to a second input of the circuit 134. The second output of the circuit 133 is also connected to a first input of a phase comparator circuit (PHASE COMPARE) 135. An output of the circuit 134 is connected to a second input of the circuit 135. A capstan frequency generator (CAPSTAN FREQUENCY GENERATOR) 136 has an output connected to an input of the divider 133. An output of the circuit 135 is connected to a line 137 for generating a signal to capstan motor drive circuits.

During the record mode of the VCR, as shown in the FIG. 3, the video head cylinder motor speed is phase locked to the video vertical sync signal on the line 116. The cylinder pulse generator output signal is compared to the vertical sync signal on the line 116, and the speed of the cylinder motor is ultimately adjusted to maintain a phase lock condition between the incoming vertical sync signal and the cylinder pulse generator signal. Additionally, an approximately 30 Hz signal is divided from the video vertical sync signal by the divide by two circuit 119 and is recorded onto tape as a separate control track. During playback, the 59.94 Hz. reference signal on the line 117, which has been divided down from the 3.58 MHz output of the circuit 98 of the chroma circuitry in the FIG. 2, is used as a reference for the cylinder servo instead of the vertical sync signal. Circuit operation is otherwise similar to the record mode.

In the record mode, the capstan speed is phase locked to the head switching pulse which is derived from the output signal of the cylinder pulse generator 126 by the circuit 127. The circuit 126 is phase locked to the input video vertical sync signal on the line 116. Therefore, it can be said that, at least indirectly, the capstan motor is phase locked to the incoming vertical sync signal during the record process. During the playback process, the capstan motor maintains a phase locked condition between the reference signal generated by the circuit 129 derived from the control track and the head switching pulse generated by the circuit 128. Because the head switching pulse is phase locked to the divided down 3.58 MHz. reference signal on the line 117 during playback, it can be said that during playback the capstan motor is phase locked to both the fixed reference on the line 117 and to the control track signal generated by the circuit 129. It should be appreciated that all of the servo functions locked to the head cylinder pulse generator circuit 126 are subject to the mechanical inertia of the head cylinder. Although the cylinder drive servo may demand a change in cylinder speed, there is a finite amount of time required to overcome the inertia of the cylinder.

Figure 4:
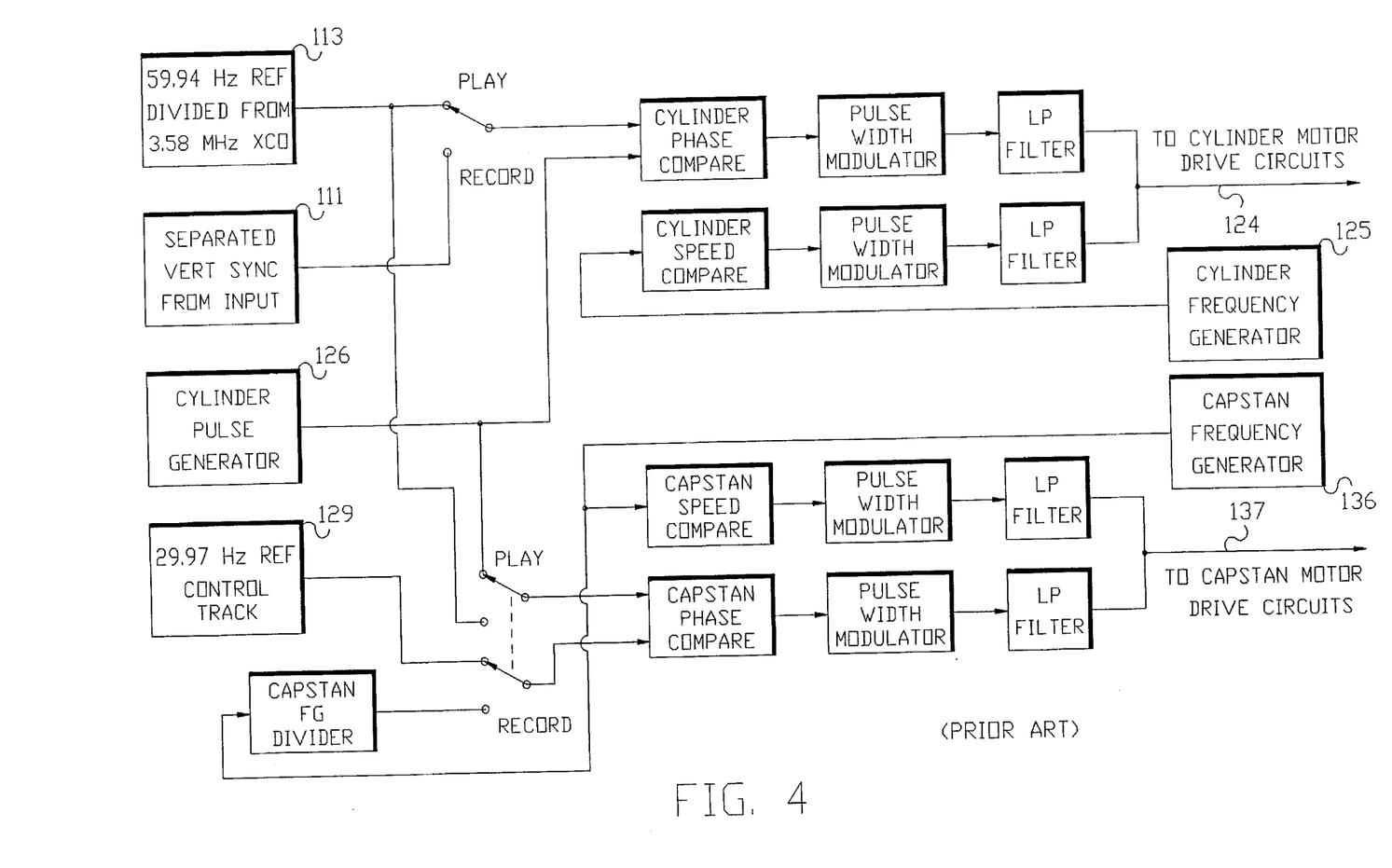
FIG. 4 is a schematic block diagram of typical digital motor control servo circuitry inherent in some consumer-grade VCR's.

The schematic diagram of the FIG. 4 depicts similar head cylinder and capstan motor servo circuits in their more recently developed digital form. Although there are differences in the actual circuitry involved, the net result and servo lock reference sources remain basically unchanged.

It should be appreciated that both the capstan and the head cylinder servo loops are heavily dependent upon the vertical sync signal on the line 116 during the record mode, by either direct or indirect means. If a video signal with a non-standard vertical rate of 61 Hz is recorded, it will play back as a 59.94 Hz vertical rate video because the fixed 59.94 Hz reference signal on the line 117 is used during the playback mode. This means that the playback video will be "slower" than the video which was input during the record mode, having a 59.94 Hz vertical rate with the horizontal line frequency slowed as well. The record input versus playback output horizontal rates will differ by the ratio of the record vertical rate to the fixed 59.94 Hz reference signal. In this example, the playback video will have a horizontal rate that is approximately 1.64 percent slower than the video that was input during the record mode. If a standard line length of 63.556 µs was input, then the playback horizontal line length will be 1.04 µs longer than that which was input, or 64.6 µs.

The playback chroma circuitry shown in the FIG. 2 will now also be referenced to this slower horizontal rate, and the 629 KHz signal on the line 90 will also be of a lower frequency, so that the difference between the 4.21 MHz source signal on the line 110 and the 629 KHz color-under signal on the line 90 is maintained at 3.58 MHz, providing an acceptable chroma output signal on the line 109. Note however in the FIG. 2, that a comb filter 93 is utilized in the chroma signal extraction process. As this comb filter utilizes a fixed, 63.556 µs delay line, it is now 1.04 µs too short with respect to the 64.6 µs line length. This produces a 1.04 µs "ghost" at all color transitions, as well as inaccurate amplitude levels of the chroma signal. This chroma ghosting effect becomes worse as the playback line length is deviated further from the standard 63.556 µs, until at about a 2 µs difference the playback burst becomes approximately one-half of the standard burst amplitude during its normal sampling period, causing the automatic color control (ACC) circuits of the playback machine to over-saturate the active video chroma. This effect, combined with the comb filter induced ghosting, produce a highly unacceptable display on a monitor device.

Further increasing the input video vertical rate during the record process produces slower horizontal rate outputs during playback. At an input vertical rate of about 102.5 percent of the standard vertical rate, most VCR's begin to lose tracking capability due to the loss of servo lock. This has been determined to be caused by the limited speed and phase locking range of the cylinder motor servo during record. If a 61.44 Hz vertical sync rate signal (102.5 percent of standard vertical rate) is input during record, the cylinder servo attempts to phase lock to this rate, but cannot owing to its limited lock range. The control track, however, is accurately created during the record process at this faster rate. Because the cylinder motor was not properly phase locked during record, during playback the capstan and cylinder servos become unlocked, inhibiting normal servo operation.

Similarly, a decrease of the input video signal vertical sync rate will also cause servo and chroma disturbances upon playback. The preferred embodiment of the present invention utilizes a modified video format with a vertical rate approximately 103 percent of the standard vertical rate. This rate ensures inaccurate servo operation and chroma output in all VCR's during attempts to record and subsequently reproduce a video signal so modified. A faster rate has been shown to be preferable to a slower one, for the purpose of ensuring vertical stability on all televisions and monitors. Some of these monitor devices use a digital countdown circuit to lock to the video sync signals. If a monitor so equipped is fed a video signal with a slower than standard vertical rate, the countdown circuit will tend to inject a vertical sync signal into the monitor's vertical scan circuits at its maximum count, or at a standard rate, depending on the particular circuit used. This could cause vertical display instability. A faster rate was chosen, with a reduced line count per field, to ensure that internal counters in such circuits are reset prior to a maximum or standard count scan pulse generation. The variation of three percent from the standard vertical rate has demonstrated no display instabilities of any kind in any tested monitor device.

Figure 5:
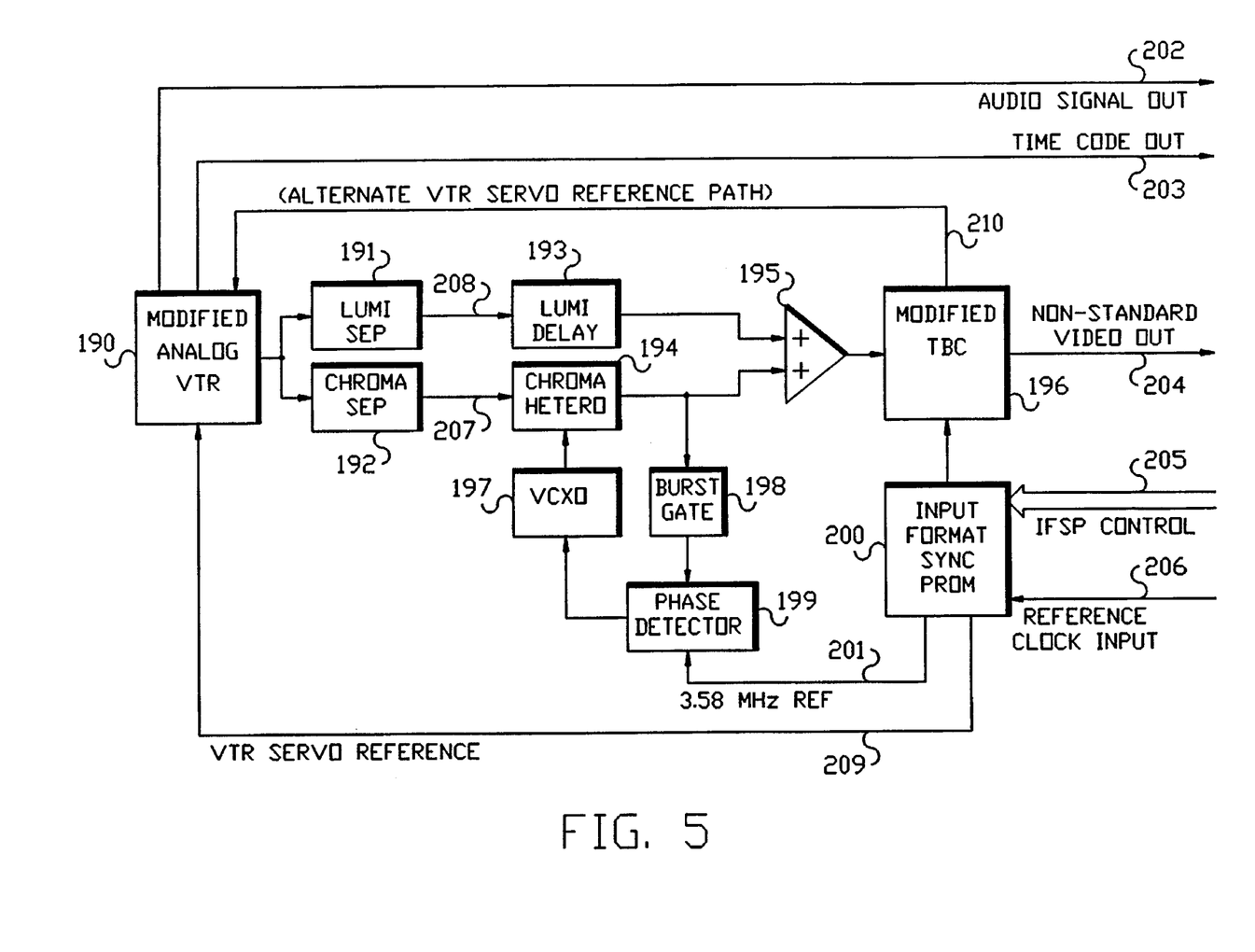
FIG. 5 is a schematic block diagram of an apparatus according to the present invention capable of converting the increased subcarrier frequency signal generated by an analog videotape recorder which has been modified to playback at a greater than standard speed, back to a standard chroma subcarrier signal.

With reference to the FIG. 5, the following is a discussion of the preferred embodiment for producing a modified video signal in accordance with the present invention. The examples shown are based upon the use of a modified analog videotape recorder (VTR), although with an understanding of the invention, it can be seen that most analog or digital format VTR's can be modified to perform appropriately.

An analog VTR, such as a 1" C-format machine, is modified (MODIFIED ANALOG VTR) 190 so as to playback at a vertical rate equal to approximately 61.824 Hz. This rate is chosen for several reasons. First, this rate represents a 3.14 percent increase over the standard vertical rate, which has been proven to be effective in preventing acceptable videotape copies. Second, it is necessary to maintain a precise frequency relationship between luminance and chrominance frequencies for proper frequency interleaving. The chroma subcarrier must be maintained at a harmonic of one-half the horizontal scan frequency, and conversely, the horizontal scan frequency must be maintained at a harmonic of twice the chroma subcarrier frequency. As the playback speed of the source VTR 190 is increased, all synchronization, chrominance, and luminance frequencies increase linearly with the amount of speed increase.

Increasing the speed of the source playback VTR 190 to a vertical rate of 61.824 Hz is equivalent to an increase of the chroma subcarrier ($f_{SC}$) by an amount equal to nine times the standard horizontal scan rate (H) of 15.734 KHz, or $f_{SC}+9H$. The FIG. 5 shows a chroma heterodyne circuit including the elements 192, 194, 197, 198, 199 and 200 for converting the $f_{SC}+9H$ subcarrier on the line 207 back to the standard 3.58 MHz frequency. A first output of the VTR 190 is connected to an input of each of a luminance separator circuit (LUMI SEP) 191 and a chroma separator circuit (CHROMA SEP) 192. An output of the circuit 191 is connected to an input of a luminance delay circuit (LUMI DELAY) 193 by a line 208 and an output of the circuit 192 is connected to a first input of a chroma heterodyne circuit (CHROMA HETERO) 194 by a line 207. A summing circuit 195 has each of a pair of inputs connected to an associated output of one of the circuits 193 and 194. An output of the circuit 195 is connected to a first input of a modified time-base corrector circuit (MODIFIED TBC) 196. A voltage controlled crystal oscillator circuit (VCXO) 197 has an output connected to a second input of the circuit 194. A burst gate generator circuit (BURST GATE) 198 has an input connected to the output of the circuit 194 and an output connected to a first input of a phase detector circuit (PHASE DETECTOR) 199. An output of the circuit 199 is connected to an input of the circuit 197. A programmable read only memory (INPUT FORMAT SYNC PROM) 200 has a first output connected to a second input of the circuit 196 and a second output connected to the circuit 199 by a line 201. A first output of the VTR 190 is connected to a line 202 for generating an audio signal and a second output of the VTR 190 is connected to a line 203 for generating a time code signal. The circuit 196 has a first output connected to a line 204 for generating a non-standard video signal. A port of the circuit 200 is connected to a bus line 205 for receiving an IFSP (input format sync prom) control signal and an input is connected to a line 206 for receiving a reference clock signal. A third output of the circuit 200 is connected to a first input of the VTR 190 by a line 209 for transmitting a VTR servo reference signal. A second output of the circuit 196 is connected to a second input of the VTR 190 by a line 210 for transmitting the VTR servo reference signal along an alternate path.

Pursuant to the fact that the $f_{SC}+9H$ subcarrier on the line 207 and the luminance components on the line 208 generated by the modified source VTR 190 maintain the necessary harmonic relationship, decreasing the $f_{SC}+9H$ signal on the line 207 by an integral multiple of $f_H$, in this case $9f_H$, via the chroma heterodyne circuit produces a modified signal which continues to maintain the necessary harmonic relationships of $f_{SC}$ to $f_H$. This insures proper frequency interlace, while maintaining "standard" subcarrier to horizontal sync timing. The basic concept depicted in the FIG. 5 is that during the increased playback speed of the source VTR 190, frequency interleave relationships of chrominance to luminance are maintained upon reconversion of the increased subcarrier frequency to a standard subcarrier frequency.

As the signal output from the modified source VTR 190 retains a 525-line format with a faster vertical rate, and therefore decreased line length, time-base correction necessitates the utilization of the time-base corrector circuit (TBC) 196 modified for this non-standard format. As shown, the apparatus for producing a signal modified in accordance with the preferred embodiment incorporates a digital sync and subcarrier generator 200 as a reference for the modified TBC signal. The use of digital reference generation allows for precise control and timing lock to the output format desired. Although the circuits depicted in the FIG. 5 indicate separate luminance and chrominance processing external to the TBC 196, it should be appreciated that many TBC's utilize internal heterodyne circuitry to correct for $f_{sc}$ to sync timing errors, and these circuits may be modified to eliminate the need for the external circuitry indicated. These block circuit schematics are provided merely to afford a more complete understanding of the preferred embodiment.

The source VTR 190 is servo locked to either the non-standard frame rate (NFR) input format sync generator reference signal on the line 209, or to the modified TBC reference signal on the line 210. This is dependent upon the specific source machine 190 utilized, and the capabilities of the TBC circuit 196. The net result of the process performed by the circuits shown in the FIG. 5 is to convert a 525-line, 59.94 Hz standard NTSC video signal to a 525-line, 61.824 Hz video format. This modified format in itself is recordable, but suffers from a non-standard line length that will produce unsatisfactory results when displayed on a monitor device incorporating a comb filter in its luminance and chrominance separation circuits.

To eliminate this problem, the 525-line, 61.824 Hz video signal is converted to a 509-line, 61.824 Hz video signal of standard horizontal line length. This is accomplished by removing eight horizontal lines per video field, and the apparatus for this operation is depicted in the FIG. 6. The circuits shown in the FIG. 6 receive signals from and generate signals to the circuits shown in the FIG. 5. An audio analog to digital converter (AUDIO A TO D CONVTR.) 215 has a first input connected to a line 216 for receiving the non-standard audio input signal generated on the line 202 shown in the FIG. 5. A line 217 is connected to a first input of a video analog to digital converter (VIDEO A TO D CONVTR.) 218 for receiving the non-standard video signal generated on the line 204 shown in the FIG. 5. A bus line 219 is connected to a port of a memory controller and input/output sampling rate generator circuit (MEMORY CONTROLLER AND INPUT/OUTPUT SAMPLING RATE GEN.) 227 for generating the IFSP control signal to the line 205 shown in the FIG. 5. A line 220 is connected to an input of a time code regenerator circuit (TIME CODE REGEN) 221 to receive the time code signal generated on the line 203 shown in the FIG. 5. A line 222 is connected to a first output of a reference clock generator circuit (REFERENCE CLOCK GENERATOR) 223 for generating the reference clock signal to the line 206 shown in the FIG. 5.

Figure 6:
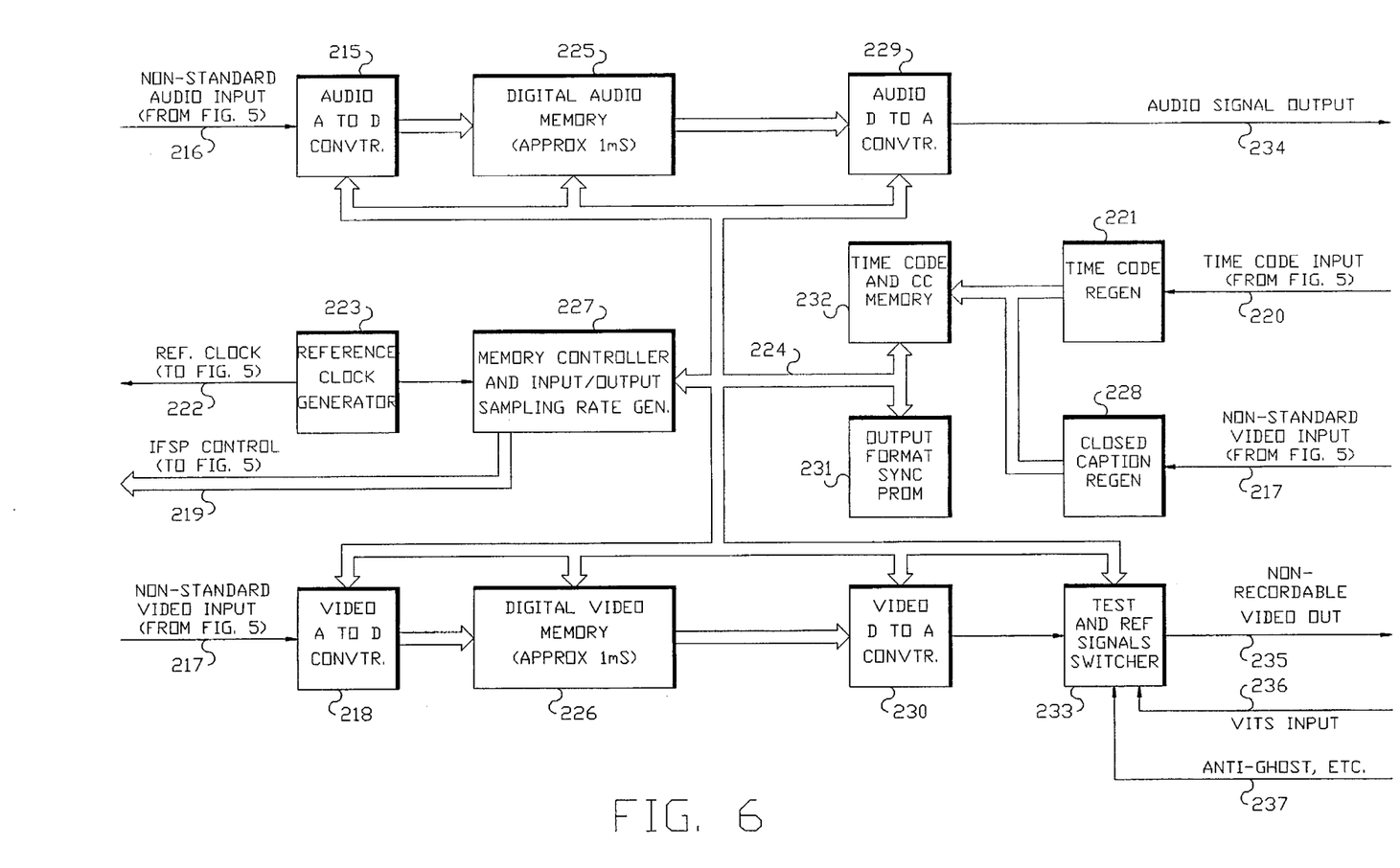
FIG. 6 is a schematic block diagram of an apparatus according to the present invention capable of modifying the number of lines present in a video waveform signal, without modifying the vertical period rate.

Most of the circuits shown in the FIG. 6 are connected to a central bus line 224 for exchanging signals. A first port of the circuit 215 is connected to the bus line 224 and a second port is connected to a first port of a digital audio memory circuit (DIGITAL AUDIO MEMORY) 225 which has a second port connected to the bus line 224. A first port of the circuit 218 is connected to a first port of a digital video memory circuit (DIGITAL VIDEO MEMORY) 226. Both of the circuits 218 and 226 have a second port connected to the bus line 224. An output of the circuit 223 is connected to an input of the circuit 227 which also has a second port connected to the bus line 224. The line 217 is also connected to an input of a closed caption regenerator circuit (CLOSED CAPTION REGEN) 228. A third port of the circuit 225 is connected to a first port of an audio digital to analog converter circuit (AUDIO D TO A CONVTR.) 229 having a second port connected to the bus line 224. A third port of the circuit 226 is connected to a first port of a video digital to analog converter circuit (VIDEO D TO A CONVTR.) 230 having a second port connected to the bus line 224. An output format sync programmable read only memory circuit (OUTPUT FORMAT SYNC PROM) 231 has a port connected to the bus line 224 and a time code and closed caption memory circuit (TIME CODE AND CC MEMORY) 232 has a first port connected to the bus line 224. The circuits 221 and 228 each have a port connected to a second port of the circuit 232. An output of the circuit 230 is connected to a first input of a test and reference signals switcher circuit (TEST AND REF SIGNALS SWITCHER) 233 having a port connected to the bus line 224.

The circuits shown in the FIG. 6 generate and receive additional signals. A line 234 is connected to an output of the circuit 229 for generating an audio signal. A line 235 is connected to an output of the circuit 233 for generating a non-recordable video signal. A line 236 is connected to a second input of the circuit 233 for receiving a VITS signal. A line 237 is connected to a third input of the circuit 233 for receiving an anti-ghost, etc. signal.

The input video format signal on the line 217 is converted to a digital signal by the video analog to digital converter circuit 218 and fed to the digital memory 226 capable of storing at least four lines of active video at the input format line length. With proper sequencing of the video memory input and subsequent output to the video digital to analog converter circuit 230, the input video format signal on the line 217 is converted to a NFR output format signal on the line 235. It should be noted that the sampling rates of the input A/D converter circuit 218, and the output D/A converter circuit 230 are maintained as equal. This precludes the generation of video bandwidth artifacts due to sample frequency beating. It also ensures that the output video horizontal line data is identical to that of the input video. This is important to maintain the proper geometry of the displayed video. Because the NFR vertical rate is faster than standard, the displayed picture height is decreased by three percent. If the horizontal line data were not also shortened by three percent, the picture would contain some geometrical non-linearity (i.e., a circle displayed on the screen would be slightly flattened vertically to an oval). By utilizing the input video horizontal line data as output from the modified source VTR machine 190 shown in the FIG. 5, the horizontal line data is already compressed by the required three percent.

The FIG. 6 also depicts the separation and regeneration of vertical interval test signals and other data. The regeneration circuits 221, 228, 232 and 233 convert the three percent higher frequency and timing of this data back to standard components. Additionally, as the NFR system drops eight lines of active video per field, signals such as closed caption or videotext may be decoded and tested to see if they were going to utilize any lines intended to be dropped, and their dam shifted as necessary to move their displays to lines not intended to be dropped.

The audio from the modified source machine is also increased in pitch by three percent, and must be corrected to maintain sync with the video. This is accomplished by converting the audio to a digital format via the audio A/D converter circuit 215 and storing the digital data temporarily in the memory circuit 225. The digital data is then output from the memory in sync with the output video, at a sample rate reduced from the input sample rate by three percent, while dropping approximately one sample of every thirty-three samples. The digital audio data is then converted back to the analog domain via the audio D/A converter circuit 229. This pitch change technology is familiar to those skilled in the art and therefore will not be examined in greater detail here. Although only one audio channel is depicted in the FIG. 6, multiple channel capability may be incorporated to allow for the utilization of stereo, surround sound and second audio program material.

Figure 7A:
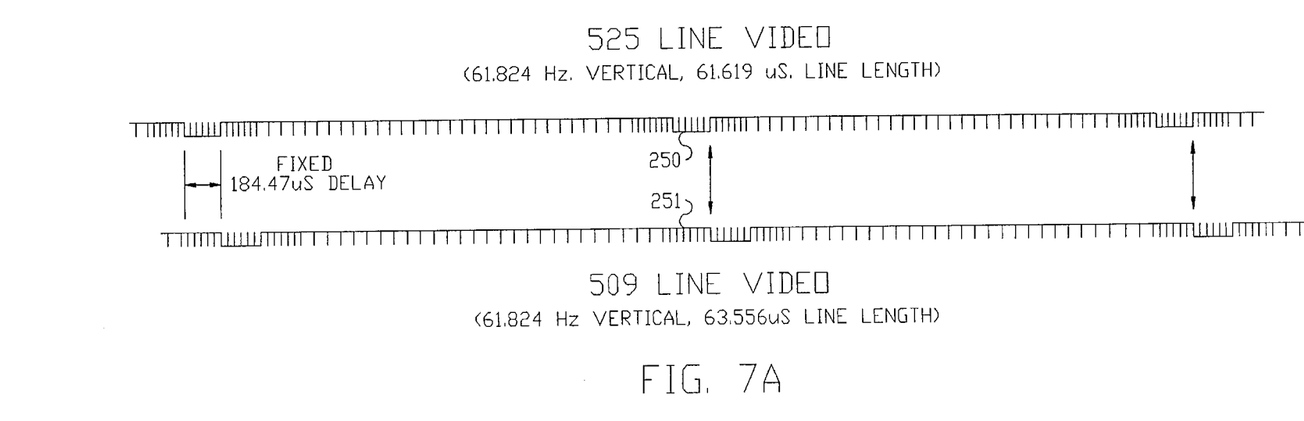
FIG. 7A is a waveform diagram of a portion of a video waveform illustrating the difference of fixed delay lengths between the input video format and the output video format vertical sync signal of the apparatus shown in the FIG. 6.
Figure 7B:
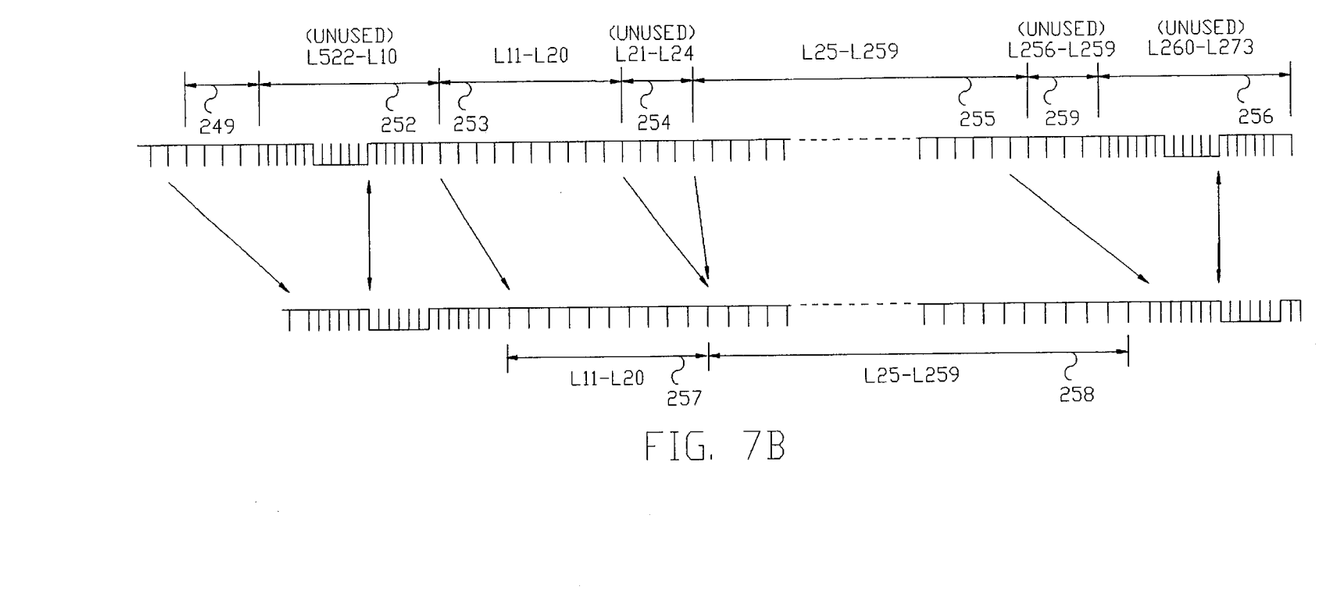
FIG. 7B is a waveform diagram of a portion of a video waveform illustrating the insertion of active video data by the apparatus shown in the FIG. 6, from the input format to the output format, relative to the vertical sync signal.

The FIG. 7A and the FIG. 7B illustrate video waveforms in which the technique according to the present invention is used to convert the input format video signal from the accelerated VTR playback to the NFR output format signal. The FIG. 7A shows the fixed delay of approximately three input format line lengths between an input format vertical sync signal 250 and an output format vertical sync signal 251. As this is a fixed delay, and the vertical rate between the input and output formats is identical, the need for large amounts of digital video storage memory is eliminated. The FIG. 7B illustrates the sequence of insertion of video data from input format signals 253 and 255 into output format signals 257 and 258 respectively for the first field of an NTSC video frame. As can be seen, eight lines of active video per field, consisting of line numbers twenty-one through twenty-four 254, and line numbers two-hundred fifty-six through two-hundred fifty-nine 259 are eliminated from each field of video. As well, vertical blanking intervals 252 and 256 at the beginning of each field are removed, and entirely new vertical intervals created by the digital sync generator circuit 200 shown in the FIG. 5 are placed into the correct locations of the modified video waveform. Similar treatment modification is made to field two of a video frame, dropping the lines two-hundred seventy-three through two hundred seventy-six and five hundred twenty-one through five hundred twenty-five. Line numbers eleven through twenty during field one, and line numbers two-hundred seventy-three through two-hundred eighty-two during field two are utilized to preserve data that may be present within the vertical interval such as closed captioning. The regeneration circuits 221, 228, 232 and 233 in the FIG. 6 are utilized to decode vertical interval data and reinsert the coded data into lines which permit the ultimate receiver of such data to function properly.

Figure 8:
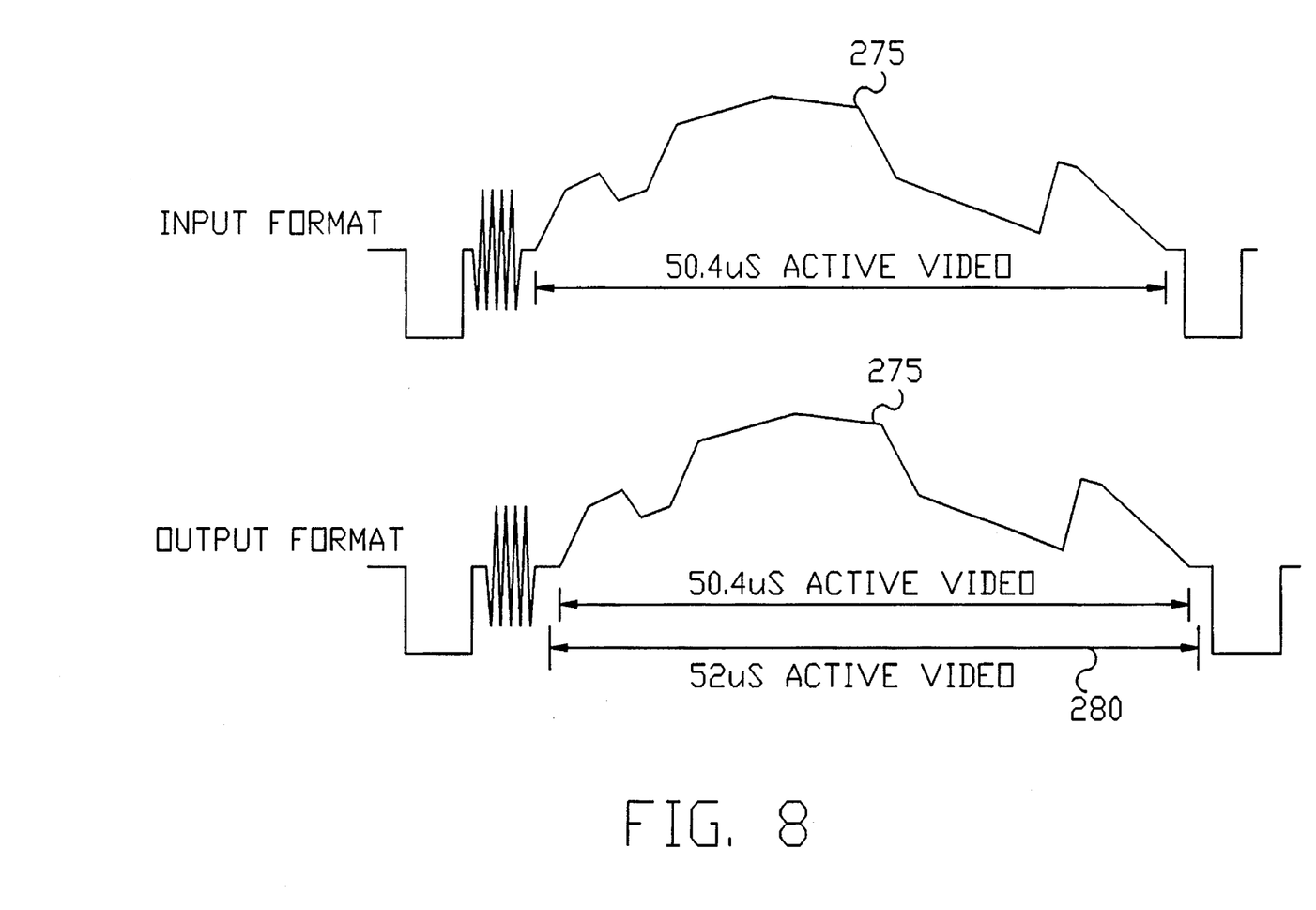
FIG. 8 is a waveform diagram of a portion of a video waveform illustrating the insertion of active video data by the apparatus shown in the FIG. 6, from the input format to the output format, relative to the horizontal sync signal.

The FIG. 8 shows waveforms which demonstrate the insertion of input format active video line data 275 into the center of an output format active video area 280 of a horizontal line of video signal. By utilizing this technique, comb filter operation in monitor devices perform normally, and produce no unwanted distortions or artifacts.

The circuits and the waveforms shown in the FIG. 5 though the FIG. 8 depict merely the preferred embodiment for achieving the modified frame rate video signal desired. Another method consists of inputting a standard video signal into a "standards converter". Such standards converters are in common use for translating video waveforms between video formats used by differing regions of the world. They are capable of converting, among other things, from one frame rate to another and could be easily modified to operate at the stated desired vertical rate. However, due to finite digital memory requirements, a transformation from a standard to a faster frame rate would necessitate the discarding of fields of information which may or may not be acceptable to the program producer.

The preferred embodiment will produce a program having a duration of three percent less than the unmodified program. Also, as discussed previously, the digital audio frequency conversion will require the discarding of three percent of the digital audio information. It has been determined that the stated degree of effect to the audio and video is not objectionable and in fact, the decreased program duration is considered a desired benefit in many cases. However, herein is disclosed a method of preparation of the program material which will allow the desired NFR video signal to be produced without the loss of audio data, while maintaining the original program duration. Firstly, a videotape containing standard program material is played on a VTR at ninety-seven percent of standard speed, while at the same time the output of this VTR is recorded onto a second VTR which is recording at standard speed. Thus, a recording containing motion at ninety-seven percent of normal, and a duration of one-hundred three percent of normal is created. This new recording also contains an analog transfer of the audio program material, such that the frequencies included in the audio signal are reduced by three percent. This videotape is then reproduced by the modified VTR 190 shown in the FIG. 5. Since this VTR has been modified to play a videotape at one-hundred three percent of normal speed, the resultant video will now contain both motion and a program duration of one-hundred percent of the standard, unmodified program content. As well, the audio signal will be restored to normal pitch, remaining in the analog state throughout the entire conversion process. Thus the audio conversion circuitry 215, 225 and 229 shown in the FIG. 6 may be bypassed or eliminated.

As stated previously, a VCR playing back a recording of a video signal containing an increase in the vertical field period of 3%, causes playback servo circuitry to attempt to reduce the vertical rate to the 59.94 Hz playback servo reference signal on the line 117 in the FIG. 3 and in the FIG. 4. The difference between the recorded vertical period rate and the 59.94 Hz reference signal produces a servo error signal too large for the machine to correct, with a resultant loss of tracking. By replacing the 59.94 Hz reference signal on the line 117 with a reference signal equal to the recorded modified field period, the VCR servo circuitry will not attempt to deviate from the recorded vertical period frequency. In addition, the time constant of the cylinder motor can be adjusted to bring its free-run speed more closely to the center of the cylinder servo correction window at this increased vertical field period. These modifications will enable a VCR to record and reproduce the NFR video waveform signals. A switching circuit may be incorporated into the VCR to allow switching between the NFR specifications and a standard video signal. This switching circuit may be manual or automatic, the automatic means operating via detection of the vertical period of the video signal, or some other detectable facet of the modified signal.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for generating a video signal program formed of a plurality of successive frames of video signal lines of information so as to produce an unviewable display from a videotape recording thereof while producing a normal picture on a video monitor comprising:

a source of a standard video waveform signal of program length having a standard number of lines of video information of a standard line length for each frame and a standard vertical rate at which successive frames of a standard frame length are generated to form the standard video waveform signal;

vertical rate modifying means connected to said source, said vertical rate modifying means being responsive to the standard video waveform signal for changing the standard vertical rate by a predetermined amount to generate an output video waveform signal having a constant non-standard frame rate; and line number modifying means connected to said vertical rate modifying means, said line number modifying means being responsive to said output video waveform signal for changing the standard number of lines in each frame by a predetermined number to generate said non-standard video waveform signal of the program length having a non-standard number of lines of video information in each frame, said predetermined amount and said predetermined number being insufficient to interfere with a visual display of a normal picture from said non-standard video waveform signal by a video monitor used to display the standard video waveform signal and being sufficient to interfere with the visual display of a normal picture by the video monitor when said non-standard video waveform signal is recorded by a recording device adapted to record the standard video waveform signal and played back by the recording device to the video monitor thereby producing an unviewable display.

2. The apparatus according to claim 1 wherein said vertical rate modifying means includes a videotape recorder (VTR) modified to reproduce a recorded standard video waveform signal with the non-standard vertical rate greater than the standard vertical rate as said output video waveform signal.

3. The apparatus according to claim 2 including a chroma heterodyne circuit connected to an output of said VTR for shifting a chroma subcarrier component of said output video waveform signal to a frequency substantially equal to a chroma subcarrier frequency of the standard video waveform signal.

4. The apparatus according to claim 1 wherein said line number modifying means includes a video analog to digital converter having a signal input connected to said vertical rate modifying means for receiving said output video waveform signal and having a signal output connected to an input of a digital video memory, said digital video memory having a signal output connected to a signal input of a video digital to analog converter, said video digital to analog converter having a signal output for generating said non-standard video waveform signal, and a reference clock generator having an output connected to an input of a memory controller and input/output sampling rate generator, said memory controller and input/output sampling rate generator having a first output connected to a sampling rate input of said video analog to digital converter for controlling an analog to digital conversion rate of said output video waveform signal, having a second output connected to a memory addressing input of said digital video memory for controlling read and write operations and timing of said digital video memory and having a third output connected to a sampling rate input of said video digital to analog converter for controlling a digital to analog conversion rate of said output video waveform signal to generate said non-standard video waveform signal.

5. The apparatus according to claim 1 wherein said line number modifying means includes an audio analog to digital converter having an input for receiving an audio signal component of said output video waveform signal and an output connected to a digital audio memory for storing digitized information for subsequent processing, said memory having an output connected to an input of an audio digital to analog converter, said audio digital to analog converter having an output for generating an audio signal component of said non-standard video waveform signal.

6. The apparatus according to claim 1 wherein said line number modifying means includes a video information regeneration means having an input connected to said vertical rate modifying means for receiving video information present within a vertical blanking interval of said standard video waveform signal and an output connected to said video digital to analog converter for relocating said video information to a selected vertical blanking interval location within said non-standard video waveform signal to enable circuitry in the video monitor responsive to said video information to utilize said video information to produce a normal picture from said non-standard video waveform signal.

7. A video storage medium playback device for generating a video waveform output signal from a video waveform signal program recorded on a video storage medium, the video waveform signal program being formed of a plurality of successive frames of video signal lines of information for producing a visual display of a picture by a video monitor, comprising:

a servo motor circuit having a playback mode of operation for playing back a non-standard predetermined vertical rate video waveform signal program recorded on a video storage medium to generate a video waveform output signal, said servo motor circuit being responsive to a non-standard reference frequency signal during said playback mode of operation; and a reference frequency signal source connected to said servo motor circuit for generating said non-standard reference frequency signal to said servo motor circuit, said non-standard reference frequency signal having a frequency substantially equal to the non-standard predetermined vertical rate whereby when the video storage medium is played back, the non-standard predetermined vertical rate video waveform signal program recorded on the video storage medium is generated as a video waveform output signal which does not interfere with a visual display of a normal picture by a video monitor used to display a standard predetermined vertical rate video waveform signal program.

8. The device according to claim 7 wherein said reference frequency signal source generates a standard reference frequency signal having a frequency substantially equal to a standard predetermined vertical rate and said servo motor circuit is responsive to said standard reference frequency signal during another playback mode of operation whereby when a video storage medium having a standard predetermined vertical rate video waveform signal program recorded thereon is played back, the standard predetermined vertical rate video waveform signal program recorded on the video storage medium is generated as said video waveform output signal which is displayed as a normal picture by a video monitor used to display a standard predetermined vertical rate video waveform signal program.

9. A method for generating a video waveform signal program formed of a plurality of successive frames of video signal lines of information which produces an unviewable display from a videotape recording thereof comprising the steps of:
  a. selecting a video signal standard having a standard number of lines of video information of a standard line length for each video signal frame and a standard vertical rate at which successive video signal frames of a standard frame length are generated to form a standard video waveform signal;
  b. generating a non-standard video signal frame having a non-standard number of video signal lines of video information and a non-standard frame length;
  c. repeating said step b. to generate a plurality of the non-standard video signal frames at a constant non-standard vertical rate; and
  d. forming a non-standard video waveform signal program including the plurality of the non-standard video signal frames in succession whereby the non-standard video signal frames do not interfere with a visual display of a normal picture by a video monitor used to display the standard video waveform signal, do not interfere with a recording operation of a recording device adapted to record the standard video waveform signal and do interfere with the visual display of a normal picture by the video monitor when the non-standard video waveform signal program is recorded by the recording device adapted to record the standard video waveform signal and the recorded non-standard video waveform signal program is played back by a playback device adapted to play back the standard video waveform signal to the video monitor thereby producing an unviewable display including at least one of chroma ghosting and over-saturated active video chroma.

10. The method according to claim 9 including a step of recording the non-standard video waveform signal program onto a storage medium.

11. The method according to claim 9 wherein the step b. is performed by generating the video signal lines of information with a line length substantially equal to the standard line length.

12. The method according to claim 9 wherein the step a. is performed by selecting a NTSC video waveform signal standard and the step b. is performed by generating the non-standard video signal frame with 509 video signal lines as the non-standard number.

13. The method according to claim 9 wherein the non-standard frame length is approximately 3% shorter than the standard frame length.

14. The method according to claim 9 wherein the steps b., c. and d. are performed by playing a recorded standard video waveform signal program on a playback device having a playback mode for playing recorded video waveform signals at a predetermined speed corresponding to the non-standard vertical rate.

15. The method according to claim 9 wherein the steps b., c. and d. are performed by playing a recorded standard video waveform signal program on a first recording device operating at a predetermined speed less than a speed corresponding to the standard vertical rate to generate an output signal and recording the output signal on a second recording device operating at a speed corresponding to the standard vertical rate to record the non-standard video waveform signal program on a storage medium.

16. The method according to claim 9 including a step of broadcasting the non-standard video waveform signal program to a video monitor by one of radio frequency, cable, satellite and fiber optic transmission means.

17. The method according to claim 9 including a step of maintaining a chroma subcarrier component of the non-standard video waveform signal program at a frequency interleave relationship with respect to a luminance waveform component of the non-standard video waveform signal program which frequency interleave relationship corresponds to a standard frequency interleave relationship of the video signal standard selected in the step. a.

18. The method according to claim 9 including a step of relocating video information present within a vertical blanking interval of the standard video waveform signal program to a selected location within the non-standard video waveform signal program to enable circuitry in the video monitor responsive to the video information to utilize the video information to produce a normal picture from the non-standard video waveform signal program.

19. The method according to claim 9 wherein the step d. is performed by forming the non-standard video waveform signal program entirely from the non-standard video signal frames.

20. The method according to claim 9 wherein the non-standard vertical rate is insufficient to cause at least one of a capstan servo motor and a cylinder servo motor of a VCR adapted to record the standard video waveform signal to lose tracking.

* * * * *